(12) United States Patent
Yoshimoto et al.

(10) Patent No.: US 8,665,503 B2
(45) Date of Patent: Mar. 4, 2014

(54) IMAGE READING DEVICE AND IMAGE FORMING APPARATUS

(75) Inventors: Mitsuharu Yoshimoto, Osaka (JP); Yasuhiro Suto, Osaka (JP); Shohichi Fukutome, Osaka (JP); Kenji Nakanishi, Osaka (JP); Hisashi Yamanaka, Osaka (JP); Sohichi Takata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 145 days.

(21) Appl. No.: 13/195,058

(22) Filed: Aug. 1, 2011

(65) Prior Publication Data

US 2012/0026562 A1     Feb. 2, 2012

(30) Foreign Application Priority Data

Aug. 2, 2010   (JP) ................................. 2010-173846

(51) Int. Cl.
*H04N 1/04*     (2006.01)
(52) U.S. Cl.
USPC ........................... 358/498; 358/474; 358/408
(58) Field of Classification Search
USPC ................................. 358/496, 498, 474, 408
See application file for complete search history.

(56) References Cited

U.S. PATENT DOCUMENTS

| 6,628,433 | B1 * | 9/2003 | Westcott et al. | 358/474 |
| 6,930,805 | B2 * | 8/2005 | Araki et al. | 358/496 |
| 8,223,406 | B2 * | 7/2012 | Osakabe | 358/474 |
| 2003/0161012 | A1 * | 8/2003 | Kusunose | 358/498 |
| 2003/0210433 | A1 * | 11/2003 | Westcott et al. | 358/474 |
| 2008/0259415 | A1 * | 10/2008 | Ishido | 358/498 |
| 2010/0123282 | A1 * | 5/2010 | Miyakoshi | 271/3.19 |
| 2011/0157666 | A1 * | 6/2011 | Hirokawa et al. | 358/498 |

FOREIGN PATENT DOCUMENTS

| JP | 3-249058 | A | | 11/1991 |
| JP | 8-133552 | A | | 5/1996 |
| JP | 8-157100 | A | | 6/1996 |
| JP | 10-35956 | A | | 2/1998 |
| JP | 2000-26003 | A | | 1/2000 |
| JP | 2002-77542 | A | | 3/2002 |
| JP | 2002-94740 | A | | 3/2002 |
| JP | 2002094740 | A | * | 3/2002 |
| JP | 2002-281238 | A | | 9/2002 |
| JP | 2003-110808 | A | | 4/2003 |
| JP | 2003-333242 | A | | 11/2003 |
| JP | 2007067504 | A | * | 3/2007 |
| JP | 2010-63003 | A | | 3/2010 |

* cited by examiner

*Primary Examiner* — Houshang Safaipour
*Assistant Examiner* — Richa Mishra
(74) *Attorney, Agent, or Firm* — Birch, Stewart, Kolasch & Birch, LLP

(57) ABSTRACT

A document reading section includes a document load table, a document load tray, a first document receiving tray, a linear conveyance path, a first guide member and a first reading section. The linear conveyance path, inclining downward from the document load tray, reaches the first document receiving tray. The first guide member is disposed in the linear conveyance path, and its top surface inclines downward along the linear conveyance path toward a downstream side in a document conveying direction in relation to the document load table. The first guide member is disposed in such a manner that part of its top surface intersects with a plane containing a top surface of the document load table.

4 Claims, 4 Drawing Sheets

IMAGE READING DEVICE AND IMAGE FORMING APPARATUS

CROSS REFERENCE

This Nonprovisional application claims priority under 35 U.S.C. §119(a) on Patent Application No. 2010-173846 filed in Japan on Aug. 2, 2010, the entire contents of which are hereby incorporated by reference.

BACKGROUND OF THE INVENTION

The present invention relates to an image reading device provided with a document convey-read mode for reading an image of a document while conveying the document and to an image forming apparatus provided with the image reading device.

As described in Japanese Patent Unexamined Publication No. 2010-63003 bulletin, for instance, an image reading device has been known conventionally that is provided with a stationary document read mode for reading an image of a document placed on top of a first document table, and a document convey-read mode for reading an image of a document on top of a second document table while conveying the document placed on a document load tray piece by piece.

In such an image reading device that is provided with both the stationary document read mode and the document convey-read mode, the first document table and the second document table are disposed at the same height in order to share an image reading section within both of the above-mentioned read modes.

Among such conventional image reading devices, there is one in which a document receiving tray is disposed above the first document table, in which a document load tray is disposed above the document receiving tray, and in which a document conveying path extending from the document load tray to the document receiving tray is curved. By so doing, miniaturization of the image reading device has been attempted in conventional image reading devices.

However, in the conventional image reading devices, because the document conveying path is curved, a head edge portion of a document rubs against the document conveying path when a thick document such as card is conveyed in the document convey-read mode; so that there is a risk that conveyance failure such as paper jamming of the document and/or instability of conveyance speed occurs. The document conveyance failure gives rise to an occurrence of reading image failure such as inability to acquire a reading image and/or deterioration of reading image quality.

Also, even in a case where the document load tray and the document receiving tray are arranged in a transverse direction rather than vertical direction, and where the second document table is disposed in the same plane that the first document table defines as in conventional image reading devices, a curved portion occurs in a document conveying path that includes the second document table in an attempt to have the document conveying path disposed avoiding the first document table. Therefore, there is a risk that the reading image failure occurs caused by the document conveyance failure when a document is a thick one.

The present invention is directed to providing an image reading device capable of suppressing reading image failure caused by conveyance failure of a thick document in a document convey-read mode, and an image forming apparatus provided with the image reading device.

SUMMARY OF THE INVENTION

An image reading device of the present invention carries out a reading operation in a stationary document read mode for reading an image of a stationary document, or in a document convey-read mode for reading an image of a document while conveying the document. The image reading device includes a first document table, a document load tray, a first document receiving tray, a linear conveyance path and a second document table. Onto a top surface of the first document table, a document is placed in the stationary document read mode. Onto the document load tray, a document whose image is to be read is placed in the document convey-read mode. To the first document receiving tray, the document whose image has been read is discharged in the document convey-read mode. The linear conveyance path, inclining downward from the document load tray, reaches the first document receiving tray. The second document table is disposed in the linear conveyance path, and a top surface of the second document table inclines downward along the linear conveyance path toward a downstream side in a document conveying direction in relation to the first document table. The second document table is disposed in such a manner that part of its top surface intersects with a plane containing the top surface of the first document table.

By this configuration, in the document convey-read mode, a document is conveyed on the linear conveyance path; and when it passes over the second document table, an image on a first face of the document is read. The second document table, which is disposed on a side of the first document table, inclines downward along the linear conveyance path toward the downstream side in the document conveying direction in relation to the first document table. As a result, the linear conveyance path is disposed linearly with a reduced degree of curvature to avoid the first document table. Therefore, document conveyance failure is suppressed even when the document is a thick one such as card document or the like. By the present invention, reading image failure caused by the conveyance failure of a thick document in the document convey-read mode can be suppressed.

An image forming apparatus of the present invention is provided with the above-mentioned image reading device. The document conveyance failure is suppressed even when the document is a thick one such as card document or the like, so that an image can be formed based on image data of high quality.

DETAILED DESCRIPTION OF THE INVENTION

Figure 1:
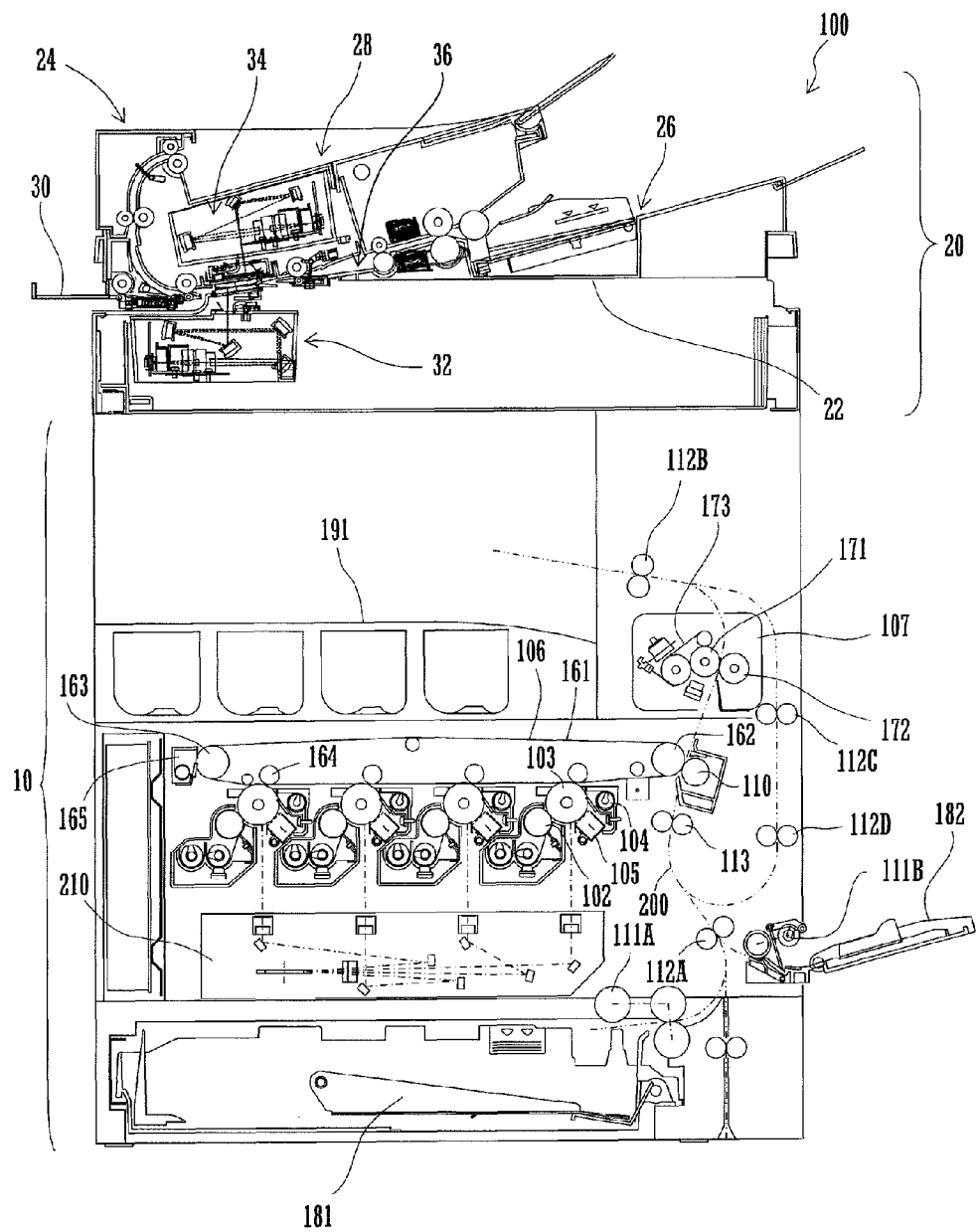
FIG. 1 is a drawing showing a configurative outline of an image forming apparatus according to an embodiment of the present invention.

An embodiment of the present invention is explained below referring to the drawings.

As shown in FIG. 1, an image forming apparatus 100 includes a document reading section (image reading device) 20 and an image forming section 10. The image forming apparatus 100 forms a multicolored or a monochromatic image onto a sheet (recording medium) based on image data that have been transmitted from outside or that have been produced by the image reading device 20.

The document reading section 20 carries out a reading operation in a stationary document read mode that reads an image of a document placed onto a document load table (a first document table) 22, or in a document convey-read mode that reads an image of a document while conveying it piece by piece from a document load tray 26.

The document reading section 20 is configured so as to be capable of simultaneously reading images on either side face of the document being conveyed in the document convey-read mode. The document reading section 20 includes a document load table 22 made of a transparent glass. To the document load table 22, a manually fed document is placed. On an upper side of the document load table 22 is installed an automatic document processing unit 24. The automatic document processing unit 24 is configured so as to convey a document on the document load tray 26 sequentially via a document conveying path 36 to a second document receiving tray 28 for discharging a normal paper document of which thickness is less than a predetermined threshold value, or to a first document receiving tray 30 for discharging a thick document of which thickness is not less than the predetermined threshold value. As the thick documents, cards and envelopes can be given, for example.

On either side of the document conveying path 36 are installed a first reading section 32 configured so as to read an image on a first face of a document being conveyed or an image of a document placed on the document load table 22, and a second reading section 34 configured so as to read an image on a second face of the document being conveyed. Here, the first reading section 32 and the second reading section 34 respectively employ a configuration consisting of a reduction optical system including a CCD (Charge Coupled Device); however, they may be ones employing a CIS (Contact Image Sensor). Additionally, detailed information about the configuration of the document reading section 20 will be described below.

Below the document reading section 20 is disposed the image forming section 10. The image forming section 10 includes an optical scanner 210, a developing device 102, a photoreceptor drum 103, a cleaner unit 104, an electrostatic charger 105, an intermediate transfer belt unit 106, a fuser unit 107, a paper feed cassette 181 and a copy receiving section 191.

The image data handled in the image forming apparatus 100 correspond to a color image making use of respective colors of black, cyan, magenta and yellow. Accordingly, the developing device 102, the photoreceptor drum 103, the electrostatic charger 105 and the cleaner unit 104 are respectively installed by tetrad so as to form four kinds of toner images corresponding to the respective colors, and are respectively set to black, cyan, magenta and yellow; whereby four image forming stations are configured.

The electrostatic charger 105 is a charging means to charge a surface of the photoreceptor drum 103 uniformly at a predetermined electrostatic potential; and other than a charger type as shown in FIG. 1, a contact type electrostatic charger such as roller type or brush type is occasionally used.

The optical scanner 210 is configured so as to form an electrostatic latent image on the respective surfaces of the photoreceptor drums 103 based on the image data inputted.

Each developing device 102 makes the electrostatic latent image formed on each photoreceptor drum 103 a manifest image with each toner of four colors of black, cyan, magenta and yellow. Each cleaner unit 104 removes and collects the toner remaining on the surface of each photoreceptor drum 103 after the development and image transfer.

The intermediate transfer belt unit 106 disposed above the photoreceptor drums 103 includes an intermediate transfer belt 161, an intermediate transfer belt drive roller 162, an intermediate transfer belt idle roller 163, an intermediate transfer roller 164 and an intermediate transfer belt cleaning unit 165. As regards the intermediate transfer roller 164, four of them are installed corresponding to the respective colors of black, cyan, magenta and yellow.

The intermediate transfer belt drive roller 162, the intermediate transfer belt idle roller 163 and the intermediate transfer rollers 164 pass and rotate the intermediate transfer belt 161 over them in a tensioned condition. Each intermediate transfer roller 164 gives the toner image on each photoreceptor drum 103 a transfer bias to transfer the toner image on each photoreceptor drum 103 onto the intermediate transfer belt 161.

The intermediate transfer belt 161 is installed so as to be in contact with each of the photoreceptor drums 103. The intermediate transfer belt 161 has a function to form a color toner image, that is, a multicolored toner image, on the intermediate transfer belt 161 through sequential superimposition of transfer of the toner images of the respective colors formed on the photoreceptor drums 103 onto the intermediate transfer belt 161. The intermediate transfer belt 161 is formed into an endless shape, for example, with a film of around 100 μm through 150 μm thick.

The transfer of the toner images from the photoreceptor drums 103 to the intermediate transfer belt 161 is carried out by the intermediate transfer rollers 164 in contact with a backside of the intermediate transfer belt 161. To each intermediate transfer roller 164 a transfer bias of high voltage is applied so as to transfer the toner image. The transfer bias is of reverse polarity to an electrostatic charge polarity (for instance, negative) of the toner, and is therefore positive, for example. In this embodiment, the roller geometry is used as a transfer electrode; however, a brush-shaped transfer electrode or the like may be used otherwise.

The toner images that have respectively been made a manifest image from the electrostatic latent image on each photoreceptor drum 103 depending on the respective hues as described above are superimposed on the intermediate transfer belt 161. The superimposed toner image is transferred onto a sheet by a transfer roller 110 disposed at a position where the sheet comes into contact with the intermediate transfer belt 161 as the intermediate transfer belt 161 rotates.

At this time, the intermediate transfer belt 161 and the transfer roller 110 are caused to press and contact each other with a predetermined nip pressure, and a voltage to cause the toner image to be transferred onto the sheet is applied to the transfer roller 110. The voltage is of reverse polarity to the electrostatic charge polarity (for instance, negative) of the toner, and is therefore positive, for example. Further, in order to constantly obtain the above-mentioned nip pressure, either of the secondary transfer roller 87 and the intermediate transfer belt drive roller 85 is chosen to be made of a rigid material; then to the other is employed a flexible material such as elastic roller, etc. As the rigid material, a metal can be given, for example. As the flexible material, an elastic rubber roller or a foamed resin roller can be given, for example.

Also, as described above, the toner which adhered to the intermediate transfer belt 161 through its contact with the photoreceptor drums 103 or which remains on the intermediate transfer belt 161 after the transfer onto the sheet has been carried out by the transfer roller 110 is removed and collected by the intermediate transfer belt cleaning unit 165 so as to prevent color mixture of toners in the next step.

In the paper feed cassette 181 are stored sheets to be used for image forming. The paper feed cassette 181 is installed on a lower side of the optical scanner 210. Sheet(s) to be used for image forming can also be placed on a manual paper feed cassette 182. To the copy receiving section 191 installed above the image forming section 10, the sheet having finished with image forming is discharged face down.

In the image forming section 10, a paper conveying path 200 is provided in a generally vertical configuration for conveying the sheet from the paper feed cassette 181 or the manual paper feed cassette 182, by way of the transfer roller 110 and the fuser unit 107, to the copy receiving section 191. In close proximity to the paper conveying path 200, which extends from the paper feed cassette 181 or the manual paper feed cassette 182 to the copy receiving section 191, are disposed pick-up rollers 111A, 111B, a plurality of conveyance rollers 112A through 112D, a paper stop roller 113, the transfer roller 110 and the fuser unit 107.

The conveyance rollers 112A through 112D are small rollers to facilitate and assist conveyance of the sheet, and the plurality thereof are installed along the paper conveying path 200. The pick-up roller 111A, which is installed in the vicinity of an edge of the paper feed cassette 181, supplies the sheet by picking it up piece by piece from the paper feed cassette 181 to the paper conveying path 200. Similarly, the pick-up roller 111B, which is installed in the vicinity of an edge of the manual paper feed cassette 182, supplies the sheet by picking it up piece by piece from the manual paper feed cassette 182 to the paper conveying path 200.

The paper stop roller 113 holds the sheet temporarily while it is conveyed through the paper conveying path 200, and has a function to convey the sheet to the transfer roller 110 with a timing that adjusts the leading edge of the sheet to the leading edge of the toner image on the intermediate transfer belt 161.

The fuser unit 107 includes a heating roller 171 and a pressure roller 172, and the heating roller 171 and the pressure roller 172 rotate holding the sheet in between. The heating roller 171 is set by a control section to a predetermined fusing temperature based on a signal from a temperature sensor which is not illustrated; and, together with the pressure roller 172, has a function of heat fusing on the sheet by means of the thermo-compression bonding of the toner onto the sheet, i.e., through fusing, mixing and pressure-contacting the transferred multicolor toner image onto the sheet. The fuser unit 107 further includes an external heating belt 173 for heating the heating roller 171 from outside.

Next, paths through which the sheet is conveyed are explained. As described above, the image forming apparatus 100 is equipped with the paper feed cassette 181 for receiving the sheets beforehand and the manual paper feed cassette 182.

The sheet conveyed from either of the paper feed cassettes 181, 182 is conveyed to the paper stop roller 113 by the conveyance roller 112A of the paper conveying path 200, and is conveyed to the transfer roller 110 with a timing that adjusts the head of the sheet to the head of the toner image on the intermediate transfer belt 161; whereby the toner image is transferred onto the sheet. Subsequently, unfixed toner on the sheet is melted and stuck thereto by heat while the sheet passes through the fuser unit 107; and then through the conveyance roller 112B the sheet is discharged to the copy receiving section 191.

The above-mentioned sheet conveying path is the one for use in the case of demand for single sided printing onto sheet; whereas in the case of demand for duplex printing, when a sheet that has undergone the single sided printing as described above and that has passed through the fuser unit 107 is held at its rear edge by the final conveyance roller 112B, the rotational direction of the conveyance roller 112B is reversed; whereby the sheet is led to the conveyance rollers 112C, 112D. Then, after passing through the paper stop roller 113 and undergoing printing on its rear face, the sheet is discharged to the copy receiving section 191.

Figure 2:
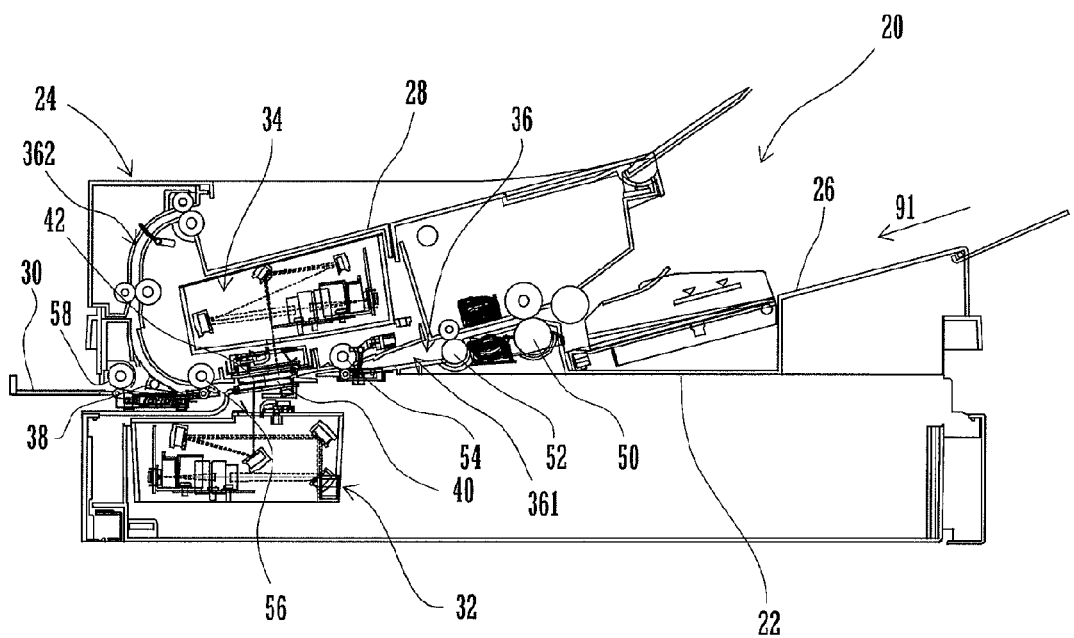
FIG. 2 is a drawing showing a configurative outline of a document reading section.
Figure 3:
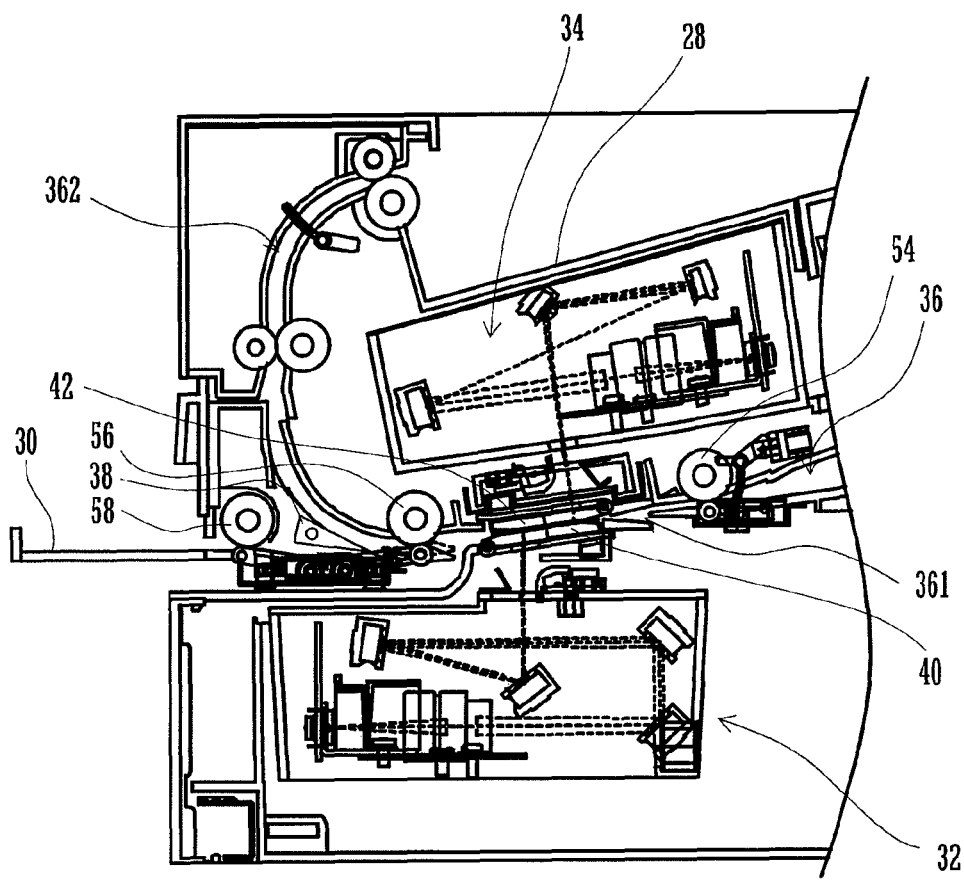
FIG. 3 is an enlarged view showing a part of the document reading section.
Figure 4:
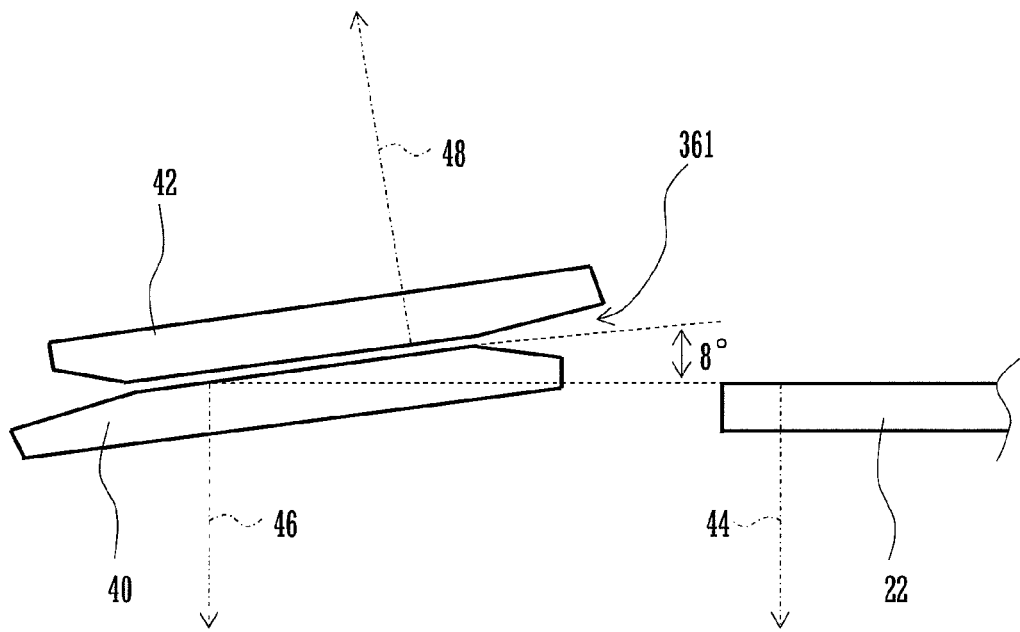
FIG. 4 is a drawing showing a mutual relationship in disposition of a first guide member, a second guide member and a document load table.

Next, using FIG. 2 through FIG. 4, configuration of the document reading section 20 is explained. The document load tray 26 is disposed above the document load table 22, and a second document receiving tray 28 is disposed above the document load tray 26.

The document load table 22 is disposed in a horizontal direction. On a side of the document load table 22, a first guide member (second document table) 40 and a second guide member (reading plate) 42 are disposed. The first guide member 40 and the second guide member 42 are each made of a transparent plate-like member such as glass.

The document conveying path 36 includes a linear conveyance path 361 and a curved conveyance path 362. The linear conveyance path 361 inclines downward from the document load tray 26, and reaches the first document receiving tray 30.

The first guide member 40 and the second guide member 42 are disposed in the middle of the linear conveyance path 361 in such a manner as to incline downward along the linear conveyance path 361 toward a downstream side in a document conveying direction 91 in relation to the document load table 22. The first guide member 40 and the second guide member 42 are disposed in such a manner as to be parallelly opposed to each other across the linear conveyance path 361. The first guide member 40 is disposed on the first reading section 32 side and the second guide member 42 is disposed on the second reading section 34 side. In this embodiment, the first guide member 40 and the second guide member 42 are parallel to the linear conveyance path 361, and incline downward at 8 degrees toward the downstream side in the document conveying direction 91 in relation to the document load table 22. The first guide member 40 is disposed in such a manner that part of its top surface intersects with a plane containing a top surface of the document load table 22.

The first guide member 40 and the second guide member 42 each have, at their upstream side edges in the document conveying direction 91 and on their surfaces opposed to each other, an inclined surface inclining in such a manner as to be further apart from each other toward the upstream side direction. Whereby, it is made easy for a thick document to be led to a space between the first guide member 40 and the second guide member 42.

On the linear conveyance path 361 are disposed conveyance rollers 50, 52, 54, 56, 58 in this order from the upstream side in the document conveying direction 91. The conveyance rollers 50 through 54 are disposed on an upstream side from the first guide member 40, and the conveyance roller 56, 58 are disposed on a downstream side from the first guide member 40.

The curved conveyance path 362 has a toppled U shape, bifurcates from the linear conveyance path 361 at a position between the first guide member 40 and the first document receiving tray 30, and reaches the second document receiving tray 28.

A path switching member 38 is disposed at the bifurcation from the linear conveyance path 361 to the curved conveyance path 362. The path switching member 38 is supported in such a manner as to be capable of being swung, and is configured so as to guide a document being conveyed either to the second document receiving tray 28 or to the first document receiving tray 30. In this embodiment, the path switching member 38 is configured so as to guide a thick document such as card toward the first document receiving tray 30, and so as to guide a normal paper document other than the thick document toward the second document receiving tray 28. For example, the thick document has a thickness not less than 0.6 mm, whereas the normal paper document has a thickness less than 0.6 mm.

A thickness of a document is inputted by an input section which is not illustrated. A control section which is not illustrated controls the path switching member 38 so that the document is guided either to the second document receiving tray 28 or to the first document receiving tray 30, based on the information inputted by the input section on the thickness of the document.

The first reading section 32 is shared by the stationary document read mode and the document convey-read mode. In the stationary document read mode, a document is placed on the top surface of the document load table 22. At the time of image reading in the stationary document read mode, the first reading section 32, while moving parallelly to the document load table 22, receives a light that is given off from a ray axis 44 perpendicular to the document load table 22 and is reflected at the first face of the document.

Also, at the time of image reading in the document convey-read mode, the first reading section 32, being in a stationary state at a position below the first guide member 40, receives a light that is given off from a ray axis 46 inclining in relation to the direction perpendicular to the first guide member 40 and is reflected at the first face of the document. The ray axis 44 and the ray axis 46 are parallel with each other.

The second reading section 34 is disposed on an opposite side of the first reading section 32 across the second guide member 42, and reads an image on the second face of the document in the document convey-read mode. The second reading section 34 receives a light that is given off from a ray axis 48 perpendicular to the second guide member 42 and is reflected at the second face of the document.

A position at which the image reading is performed in the document convey-read mode is where a plane containing the top surface of the document load table 22 intersects with the top surface of the first guide member 40. Because an optical path length from an image plane of an image of the document to the first reading section 32 is the same in the stationary document read mode and in the document convey-read mode, an occurrence of defocus is prevented in both reading modes.

In the document convey-read mode, it is preferred that the document is placed onto the document load tray 26 front face up and rear face down. In this case, the front face of the document is read by the second reading section 34, and the rear face thereof is read by the first reading section 32.

By such a document reading section 20 as stated above, in the document convey-read mode, an image on the first face of a thick document is read when the thick document passes over the first guide member 40 while being conveyed on the linear conveyance path 361. The first guide member 40, which is disposed on a side of the document load table 22, inclines downward along the linear conveyance path 361 toward the downstream side in the document conveying direction 91 in relation to the document load table 22; so that the linear conveyance path 361 is disposed linearly with a reduced degree of curvature to avoid the document load table 22. Therefore, document conveyance failure is suppressed even when the document is a thick one such as card.

Moreover, because the document load tray 26 is disposed below the second document receiving tray 28, degree of inclination of the linear conveyance path 361 is decreased as compared with a case where the document load tray 26 is disposed above the second document receiving tray 28. As a result, although the first guide member 40 is at the same level as the document load table 22, a recess of a frame, which contains the first reading section 32, being provided for the purpose of forming the linear conveyance path 361 in a linear shape can be reduced to a lesser degree or even rendered unnecessary. Accordingly, difficulty in design such as providing a recessed frame containing the first reading section is reduced. Besides, because degree of inclination of the first guide member 40 is reduced as well, degree of a change of the optical path length from the first face of the document to the first reading section 32 is small; and thus degree of defocus is reduced even when accuracy of position control of the first reading section 32 is not high.

Further, the conveyance failure is suppressed by having a thick document such as card conveyed by way of the linear conveyance path 361. Additionally, as sizes of cards are small, a size of the first document receiving tray 30 can be compactified; so that upsizing of the document reading section 20 is suppressed even when the first document receiving tray 30 is disposed on a side surface of the document reading section 20. On the other hand, in the case of the normal paper document of which thickness is less than the predetermined threshold value, such a document can be discharged above the document load tray 26 by having it conveyed by way of the curved conveyance path 362; so that upsizing of the document reading section 20 is suppressed even when the second document receiving tray 28 is of a large size.

The second reading section 34 provided in addition to the first reading section 32 enables the image reading device to read the first face and the second face of the document at the same time. Further, because the second reading section 34 reads the light that is given off from the ray axis perpendicular to the second guide member 42 and is reflected at the second face of the document, a size of an image to be read per pixel in a CCD of the second reading section 34 is smaller as compared with a case where it reads a light that is given off from a ray axis inclining in relation to the direction perpendicular to the second guide member 42 and is reflected at the face. For example, in a case where a resolution of the image reading is 600 dpi, a theoretical value per pixel for the image to be read yields 42.3*42.3 µm; and because a configuration as mentioned above makes it possible to read a size approximately in accordance with the above theoretical value, a reading length per pixel in the document conveying direction in the image to be read does not become larger; so that deterioration of the resolution of the image reading is prevented.

In addition, while the linear conveyance path 361 is preferably straight throughout the areas from the document load tray 26 to the first document receiving tray 30, this does not mean that even a slight (for instance, not more than 5 degrees) inflection or curvature to an extent with which the conveyance failure such as paper jamming of the thick document and/or instability of conveyance speed will not occur is excluded. For example, even in a case where the linear conveyance path 361 from the conveyance roller 50 to the conveyance roller 54 and the linear conveyance path 361 from the conveyance roller 54 to the conveyance roller 56 is bent or curved slightly (for instance, at 5 degrees) at a portion of the conveyance roller 54 on an upstream side of the first guide member 40, the reading image failure caused by the conveyance failure of the thick document in the document convey-read mode is suppressed by having the first guide member 40 inclining to a direction along the linear conveyance path 361 in relation to the document load table 22.

The above explanation of the embodiment is nothing more than illustrative in any respect, nor should be thought of as restrictive. Scope of the present invention is indicated by claims rather than the above embodiment. Further, it is intended that all changes that are equivalent to a claim in the sense and realm of the doctrine of equivalence be included within the scope of the present invention.

What is claimed is:

1. An image reading device that carries out a reading operation in a stationary document read mode for reading an image of a stationary document, or in a document convey-read mode for reading an image of a document while conveying the document, the image reading device comprising:
   a first document table on whose top surface a document is placed in the stationary document read mode;
   a document load tray on which a document whose image is to be read is placed in the document convey-read mode;
   a first document receiving tray to which a document whose image has been read is discharged in the document convey-read mode;
   a linear conveyance path inclining downward from the document load tray to the first document receiving tray;
   a second document table which is disposed in the linear conveyance path and a top surface of which inclines downward along the linear conveyance path toward a downstream side in a document conveying direction in relation to the first document table;
   a first reading section that receives, in a stationary state at a position below the second document table in the document convey-read mode, light that is given off from a ray axis inclining in relation to a direction perpendicular to the second document table and is reflected at a first face of a document;
   a reading plate disposed in such a manner as to be parallelly opposed to the second document table across the linear conveyance path; and
   a second reading section that is disposed on an opposite side of the first reading section across the reading plate and reads an image on a second face of a document in the document convey-read mode, wherein:
   the second document table is disposed in such a manner that part of the top surface thereof intersects with a plane containing the top surface of the first document table; and
   the second reading section receives light that is given off from the ray axis perpendicular to the reading plate and is reflected at the second face of the document.

2. The image reading device as claimed in claim 1 wherein an image reading position in the document convey-read mode is a position at which the plane containing the top surface of the first document table intersects with the top surface of the second document table.

3. The image reading device as claimed in claim 1 further comprising:
   a second document receiving tray disposed above the document load tray; and
   a curved conveyance path that bifurcates from the linear conveyance path at a place between the second document table and the first document receiving tray and that reaches the second document receiving tray.

4. An image forming apparatus comprising the image reading device as claimed in claim 1.

* * * * *